United States Patent
Basu (10) Patent No.: US 10,949,722 B2
(45) Date of Patent: Mar. 16, 2021

(54) SYSTEMS AND METHODS OF SUSTAINABILITY PROTOCOL USING DISTRIBUTED BLOCKCHAIN APPLICATION WITH IOT SENSORS

(71) Applicant: 0Chain, LLC, San Jose, CA (US)

(72) Inventor: Saswata Basu, San Jose, CA (US)

(73) Assignee: 0Chain, LLC, Cupertino, CA (US)

( * ) Notice: Subject to any disclaimer, the term of this patent is extended or adjusted under 35 U.S.C. 154(b) by 0 days.

(21) Appl. No.: 16/027,222

(22) Filed: Jul. 3, 2018

(65) Prior Publication Data

US 2019/0122086 A1 Apr. 25, 2019

Related U.S. Application Data

(60) Provisional application No. 62/707,175, filed on Oct. 24, 2017.

(51) Int. Cl.
| | |
|---|---|
| *G06K 19/06* | (2006.01) |
| *G06Q 50/02* | (2012.01) |
| *H04L 29/08* | (2006.01) |
| *H04L 9/06* | (2006.01) |
| *H04L 9/32* | (2006.01) |

(52) U.S. Cl.
CPC ....... *G06K 19/06037* (2013.01); *G06Q 50/02* (2013.01); *H04L 9/0637* (2013.01); *H04L 9/3239* (2013.01); *H04L 67/1042* (2013.01); *H04L 67/12* (2013.01); *H04L 2209/38* (2013.01)

(58) Field of Classification Search
CPC ............ G06K 19/06037; H04L 9/0637; H04L 9/3239; H04L 67/1042; H04L 67/12
USPC ......................... 235/487, 494, 385
See application file for complete search history.

(56) References Cited

U.S. PATENT DOCUMENTS

| | | | |
|---|---|---|---|
| 7,440,901 B1 | 10/2008 | Dlott et al. | |
| 10,275,739 B2* | 4/2019 | Hanis | G06Q 30/0185 |
| 2016/0342978 A1* | 11/2016 | Davis | G06Q 20/02 |
| 2018/0089638 A1* | 3/2018 | Christidis | G06Q 20/065 |
| 2018/0114261 A1* | 4/2018 | Jayachandran | G06Q 30/0282 |
| 2018/0189528 A1* | 7/2018 | Hanis | G06Q 30/0185 |
| 2018/0336515 A1* | 11/2018 | Mehring | H04L 9/0637 |
| 2018/0349485 A1* | 12/2018 | Carlisle | G06Q 50/01 |
| 2019/0012637 A1* | 1/2019 | Gillen | G06Q 10/0833 |
| 2019/0019144 A1* | 1/2019 | Gillen | G06Q 10/0833 |
| 2019/0057454 A1* | 2/2019 | Komenda | G06Q 40/08 |
| 2019/0171849 A1* | 6/2019 | Assenmacher | G06F 16/9014 |
| 2019/0180291 A1* | 6/2019 | Schmeling | G06Q 30/0185 |
| 2019/0205826 A1* | 7/2019 | Hanis | G06Q 10/087 |
| 2019/0222575 A1* | 7/2019 | Oberhauser | H04L 9/3247 |

OTHER PUBLICATIONS

Assessing the Sustainability of Agriculture at the Planning Stage, C.S. Smith and G. T. McDonald, Journal of Environmental Management, p. 15-37, 52 (1998).

\* cited by examiner

*Primary Examiner* — Paultep Savusdiphol (74) *Attorney, Agent, or Firm* — Levine's Tech Consulting, LLC; Frank E. Levine (57) ABSTRACT

A sustainability protocol using IoT sensor data on a blockchain, and presenting this data through a QR-code on the labels of sustainable goods, to enable verification by anyone, and provide incentives for the farmer, CPG (consumer product group), retailer, and the consumer to be aligned, and collectively accelerate the goals of sustainability efficiently.

22 Claims, 10 Drawing Sheets

Verifiable label from farm-to-fork

| SUSX label | Category | Markup (max 15%) |
|---|---|---|
| SUSX-M | Monitoring Water & Fertilizer usage | 10% |
| SUSX-O | Optimizing Water & Fertilizer usage | 15% |
| SUSX-FT | Fair Trade | 10% |
| SUSX-I | Imperfect Food | 15% |
| SUSX-FR | Free Roam | 10% |

Different types of SustainX labels

SustainX markup relative to regular and organic goods

FIG. 5

- Proof-of-Monitoring
  - Installer colludes with Farmer
  - CPG colludes with Farmer
- Proof-of-Optimization
  - Point optimization instead of entire zone of sensor
- Proof-of-Shipment
  - Farmer, CPG collude to pretend increased shipments or expiry dates
- Proof-of-Imperfect-Food
  - Farmer, Retailer collude to pretend increased shipments
- Proof-of-Free-Roam
  - Fake image shown to image sensor
- Proof-of-Fair-Trade
  - Fake worker accounts created, KYC process is corrupt
- Proof-of-Purchase
  - Consumer buy and return or donate items to redeem tokens
- Proof-of-Donation
  - Consumer/business collude with donation center to redeem tokens
  - Donation center returns items back to the consumer/business Potential Frauds Attack on the various sustainability protocols:

SYSTEMS AND METHODS OF SUSTAINABILITY PROTOCOL USING DISTRIBUTED BLOCKCHAIN APPLICATION WITH IOT SENSORS

PRIORITY APPLICATIONS

For purposes of the USPTO extra-statutory requirements, the present application constitutes a utility application related to and claims the benefit of priority from U.S. Provisional Patent Application No. 62/707,175 filed on Oct. 24, 2017.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

FIELD OF THE INVENTION

The present invention is in the technical field of sustainability and blockchain protocols. A sustainability protocol avoids the depletion of natural resources in order to maintain an ecological balance with the use of a distributed blockchain application using Internet of Things (IoT) sensor data.

BACKGROUND

Internet is a global computer network providing a variety of information and communication facilities, consisting of interconnected networks using standardized communication protocols. Internet is not owned by a single entity and it operates without a central governing body. The same principles of distributed governance were applied to digital currencies by providing ability to perform digital transactions that existed without support from any underlying institution. The digital ledger that records the transactions in a chain using a mathematical hierarchy is called a blockchain.

Conventional sustainability solutions are expensive, mandated, subsidized, and use government programs, which are slow and inefficient. In fact, a new study by FAO, IFAD and WFP—the UN Rome-based agencies, estimates the cost of additional investments needed to eliminate extreme poverty and hunger to be US$265 billion per year between 2016 and 2030, which is equivalent to 0.31% of global GDP. Shockingly, FAO, with a budget of $2.5 billion per year, whose primary goal is to end hunger by 2030, failed to reduce hunger in 2015-2016 timeframe, and in fact, hunger increased by 5% to 815 million. With a population increase projected to be 9 billion by 2050, we need a new approach.

SUMMARY OF THE INVENTION

The present invention is systems and methods of sustainability protocol using distributed blockchain application with Internet of Things (IoT) sensors. A system and method of smart digital labeling on a consumer product on a blockchain platform, comprising: de-centralizing posting or querying information on the consumer product; branding to identify availability of manufacturing information; parametrically identify one or more manufacturing characteristics for quality control; adding current and historical information including origin, time and one or more intermediaries; storing the parameter and the information; providing automatically with a get query on the blockchain platform the parameter or the information.

The system and method of sustainability protocol, wherein the information includes identification of farm lot, farmer price, harvest date, shipment date, consumer product group identification, consumer product group price, retailer identification, or retailer price.

The system and method of sustainability protocol, wherein the branding further includes one or more of the sustainability parameters: water usage, fertilizer usage, fair trade, imperfect food or free roam labels.

The system and method of sustainability protocol, further comprising: automatically preventing fraud and collusion between the origin manufacturer and any of the intermediaries.

The system and method of sustainability protocol, further comprising: sensing with an internet of thing sensor to automatically add brand, parameter or the information.

The system and method of sustainability protocol, further comprising: automatically adjusting applicable consumer price based on brand, parameter or the information.

The system and method of sustainability protocol, further comprising: authorizing a smart contract to reward an origin manufacturer or one or more of the intermediaries based on brand, parameter or the information.

The system and method of sustainability protocol, further comprising: tracking any subsequent sale or donation and crediting a seller or a donor.

The system and method of sustainability protocol, further comprising: accumulating information on the blockchain platform independent of and outside the control of an origin manufacturer or one or more intermediaries.

A system and method of smart digital labeling on a consumer product on a blockchain platform, comprising: de-centralizing posting or querying information on the consumer product; sustainability parametrically to identify one or more manufacturing characteristics for quality control; adding donation information for a donor; tracking automatically with a get query on the blockchain platform the sustainability parameter with the donation information.

A system and method of smart vault on a blockchain platform for consumer product, comprising: attributing a smart storage for a given entity; receiving a portion of any applicable price in a transaction for the given entity for smart storage; applying the received portion for sustainability infrastructure; restricting withdrawal from the smart storage in absence of authorization; allowing withdrawal when two or more authorization steps independent of each other are established.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION OF THE INVENTION

The systems and methods of a blockchain platform for distributed applications includes flexibility to implement sustainability protocols with smart labels. The blockchain platform provides a de-centralized platform to accumulate information that can be provided and independently accessed at different stages of manufacturing and retail distribution. The blockchain platform allows different entities with verification to post and query information regarding sustainability. Entities can be rewarded based on their roles and sustainability criteria. The accumulated information regarding current and historical data is easily accessible to an end-user, i.e. consumer.

Figure 1:
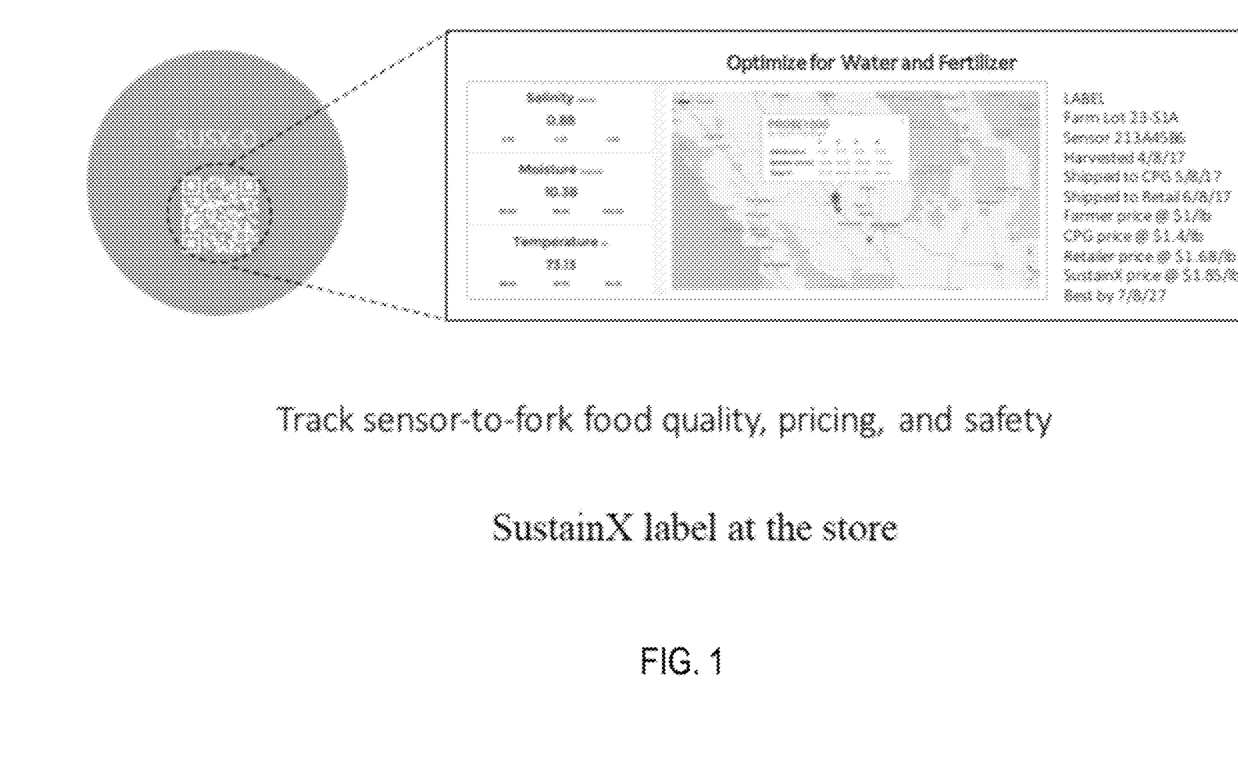
FIG. 1 depicts a sustainability protocol SustainX label at the store.

Referring now to the invention in more detail, in FIG. 1, there is shown a typical label at the store a consumer would see on the item. In our tokenized model, the sustainability network allows the incentives of the farmer, CPG (consumer product group such as Nestle, Unilever), retailer (such as Walmart, Safeway, Whole Foods), consumer, and businesses (such as restaurants) to be aligned and connected to help solve the sustainability problem together. The token is physically realized in the form of a label, which exists today for each item that a consumer purchases at the store, but does not have verifiable data. Today the process of labeling each item is already present in the food chain, but what the companies need to do is place additional data which can be verified easily by the consumer. These labels will be branded as SUSX labels, which will be the only verifiable labels in the market with transparent shipping dates, prices, and traceability all the way to a specific plot of land.

To jump start the sustainability cycle, SustainX will invest in sensors that will monitor sustainable parameters, i.e. water usage, fertilizer usage, fair trade, imperfect food or free roam, at the farm. Initially, the strategy is to deploy for free in 5-10% of the farm, so that the sustainability economic cycle starts, and then if the farmer can lower their cost and increase yield because of the sensors, software tools, and generate higher consumer demand, then it would be in their interest to invest and accelerate such sensors without any further assistance. The SustainX network would continue to deploy sensors for free, from the fees it collects from its labels, but the preference would be for new farmers that have not had prior investment. The acceleration of adoption would depend on the amount of jumpstart capital raised during the fundraising event, and the consumer awareness and demand for SUSX labeled products in the marketplace.

Consumers can use a SustainX app to scan the QR code and be able to get a detailed information about the item. A typical example of the data could be in the form of the visual in FIG. 1. The data contains the plot the product came from, the harvest date, ship date from the farmer, the price, the CPG ship date and pricing, and SustainX label markup price, and the retailer received data and price. Additional data in the form of a GPS coordinate of the sensor on the plot of land as well as the sensor readings will be shown. Since the sensor is live, all the current and historical data can be accessed with a few clicks. Such data would also encourage farmers to optimize usage of water and fertilizer.

Figure 2:
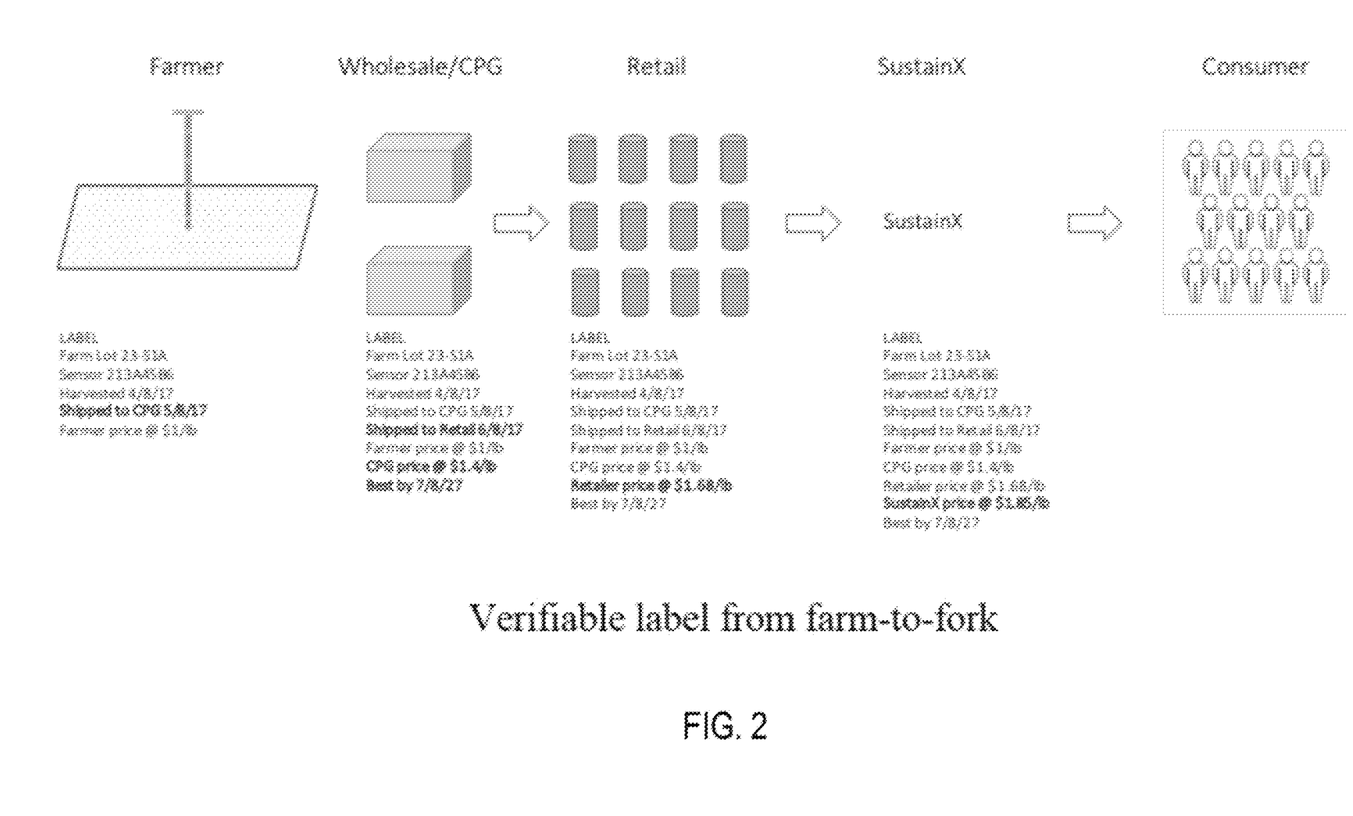
FIG. 2 shows the process of a verifiable label from farm-to-fork.
Figure 4:
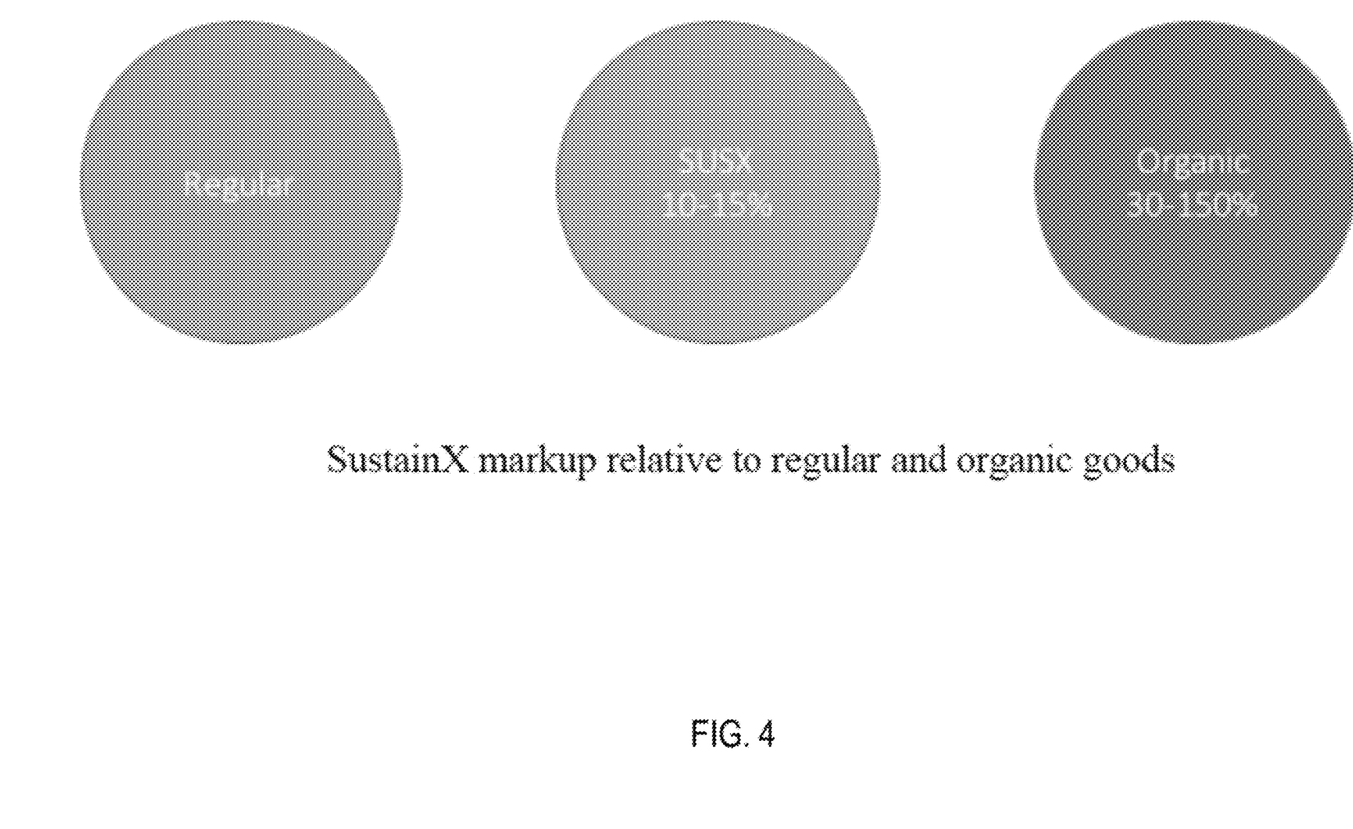
FIG. 4 shows a SustainX markup relative to regular and organic goods.

In FIG. 2, the labelling process is conceptualized. The farmer tags the crop, harvested from the plot of land that has installed the sensor, with the SUSX label. They ship the crop to a wholesaler or a CPG. A wholesaler then divides the package into smaller packages and ship them to different retail outlets. If the crop goes to a CPG, they would process the crop into products and distribute it to the retailers. Both CPG and the wholesaler would provide shipping dates and prices. At the retail, the received date and expiry date of the item is entered and then put on the shelves. For creating a label and placing it on the blockchain, the SustainX network charges a fee to the retailer, which they need to add to their final price. Depending on the type of label, the markup is expected to be between 10-15% above the regular retail price as shown in FIG. 4. To complete the cycle, the consumer purchases the SUSX labeled items, and as they check out from the store, their items are scanned along with their loyalty cards, and if they purchase SUSX labeled items, they will be given some SUSX tokens, based on the value of the items purchased. And if the consumer overbuys SUSX items, and they are able to donate such food at the donation center prior to expired dates, then they would get some SUSX tokens for those donated items. Initially, the rewards may be large to spur viral growth, but eventually will trend toward similar returns as credit card cash back. While SUSX does not dictate the prices charged by the farmer, CPG, or retailer, it is expected that all the companies in the food chain are expected to keep their prices at level and not mark them up because of additional benefits.

In one embodiment, the blockchain can provide a smart vault which collects a portion of markup fees from an entity, for example, the CPG, to use for stabilizing the blockchain labels and also provide perpetual investment for sensors that promote sustainability. An entity is further incentivized to invest in the sustainability infrastructure including, for example, the sensors that promote sustainability. A smart vault acts as a simple wallet in receiving value and requires additional security authorization for withdrawals. For example, the withdrawal may require two independent steps of authorization. In one embodiment, one authorization step could be using a mobile application and another independent step could be using an email address or secure uniform resource locator on the internet. Such a system provides additional long-term investment in the sustainability infrastructure. In one embodiment, Donors can contribute to the smart vault wallet and be able to provide a mechanism of funding for specific sustainability programs. Subsequently, the donors can track the direct or indirect benefits of their donation to the key performance indexes of sustainability.

Figure 3:
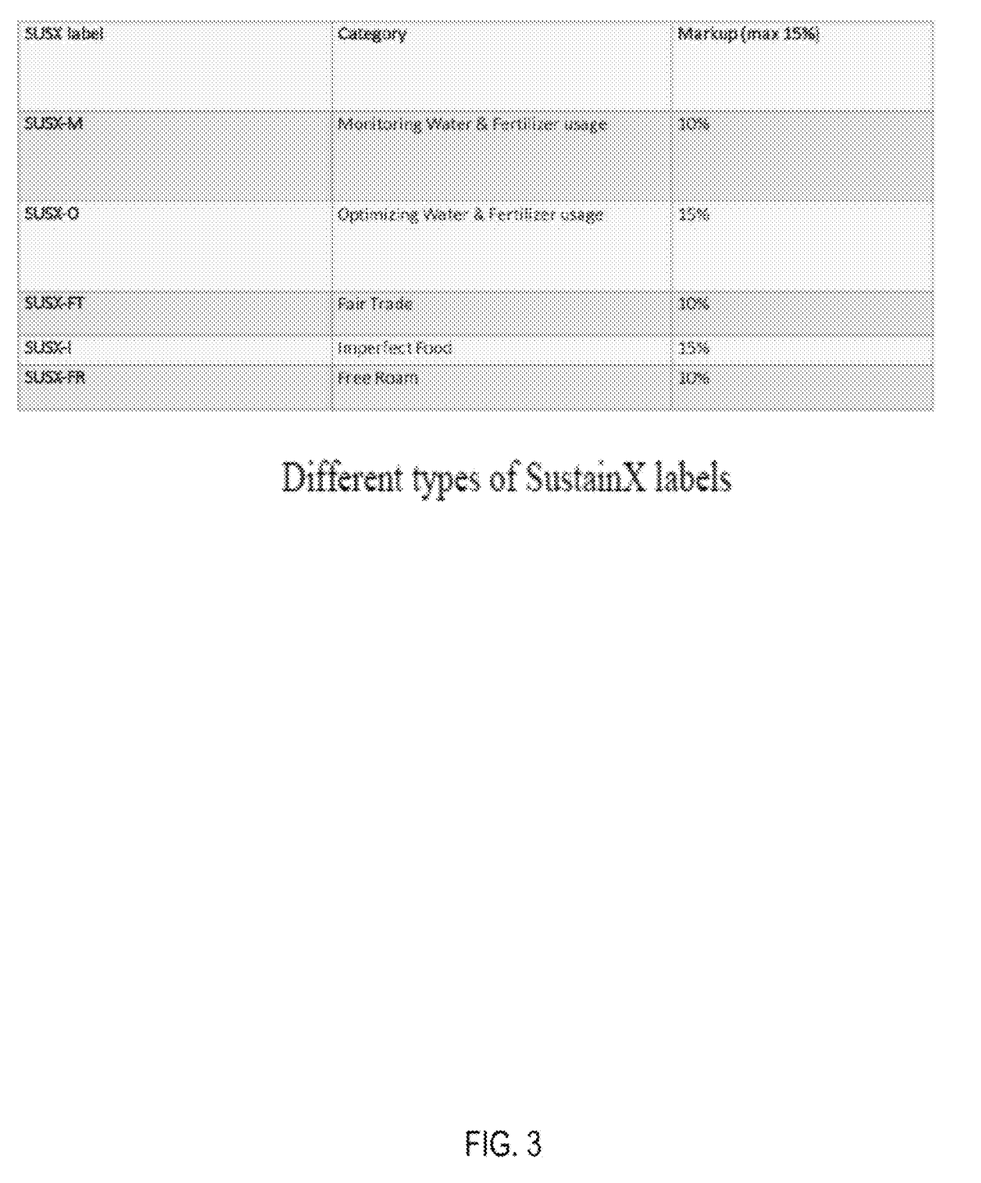
FIG. 3 shows different types of SustainX labels.

FIG. 3 depicts the first set of labels that SustainX network will focus on. There are three labels for crop farmers. The SUSX-M is a monitoring label that encourages farmers to use sensors to monitor their use of water and fertilizer; the M stands for Monitoring for water and fertilizer. If the farmers then use the AI tool and run some experiments to lower their inputs for some of their sensors, then those can be labeled SUSX-O, where O stands for Optimizing. Its likely that the farmer may experiment with a portion of the total sensors deployed with a growing scheme that uses less water and fertilizer inputs and determine if the yield is higher, before using the formula for all the other sensors. The third label SUSX-IF, where IF stands for Imperfect Foods, is more related to prevent food waste and allow the farmer to garner extra revenues that they would otherwise have to destroy their crop. This also enables consumers to buy such items which is typically priced lower than regular items and feel confident that it has been from a sustainable portion of the land, and is as healthy even though it may not look nice.

For livestock farmers, the label is SUSX-FR, where FR stands for Free Roam, and enables farmers to provide humane treatment to their animals, but curtail their cost of land use and prevent deforestation. Preventing deforestation and have a level playing field for U.S. farmers forces the incentives to be built around the notion of sustainability.

For fair trade workers involved with crops such as coffee, tea, cocoa, and cotton, if the employers implement a payroll that is based on SUSX tokens, then they would be able to label those products as SUSX-FT, where FT stands for Fair Trade, so that anyone can verify how much was paid to the workers.

The items at the store can be loosely placed in 3 types of buckets today. There are conventional and organic items, and items that are in between with a wide variety of labels. This fragmented market is the target market for SUSX, and the pricing would be stipulated to be about 10-15% above conventional items. Organic prices vary from 30-100% today because of its high cost of production, but most of the organic food has more health than environmental benefits, and address different consumer needs. The SUSX labeled items are expected to take market share from conventional items and eventually replace those as SUSX markup prices diminish over time.

The SUSX price is expected to reduce over time as shown in the chart and spreadsheet calculation in Figure. This is important to encourage faster adoption of SUSX items and this will act as a deterrent to increased prices in the future. As more SUSX items get adopted there will be more sensors in the farms globally, which will increase yield to meet demand from an increase in population.

There are eight proofs identified as essential to preserve the integrity of the protocol and ensure global acceptance.

Proof of Monitoring—

One of the key aspects of the SustainX protocol is for farmers to prove that they have installed the sensor in their ground and started the monitoring process. The first step in the protocol process is to select installers through a voting process. The selection of the sensor vendor, installer, and maintenance service provider would be based on the voting process where vendors submit their plan, and stakeholders vote and commit to a long-term agreement. The selected installers then work with the farmers to identify locations where they will install the sensors. The installers then start deploying each sensor in the ground. The installation process can be mechanized with a robotic equipment. The installer, who will need to have an account on SustainX, will use the SustainX Installer mobile app to scan the serial number of the sensor, record the GPS location, and send the combined information to the network. At the network, the serial number and GPS location are verified to be unique. Then the network allows the data in the network, where it is further validated to see if the sensor is sending data that is within a range of acceptable values. If the sensor is in the air, it will send a completely different signature. If the sensor malfunctions, then it will send a different signature. If all goes well, then the network will start recording the data on the blockchain, and the installer gets paid simultaneously for their service.

There are some potential fraud cases to consider. For example, the farmer or installer could falsify installation and have a device that sends data that would be accepted by the network by creating a medium that simulates a soil environment. Although this is extremely hard to recreate and maintain over the long term, this is conceivable in theory. Even in this case, a simple verification would be to look up satellite images of the GPS location of the sensor to see if it is present and properly installed. However, if the canopy of the crop covers the sensors completely then the network can have a robot, which are inexpensive to operate and can be part of the farm deployment, to go to those locations periodically and upload an image to the network to prove the veracity of the data. Needlessly to say, a farmer or installer is unlikely to conduct any fraud, because the loss of business and brand would be more damaging than any short-term revenue increase by falsifying a crop shipment with SUSX labels.

Proof of Shipment—

To prove that the farmer sold their sustainable crop to the CPG or wholesaler, the farmer needs to label the harvested crop from the plot and record the shipped date on the blockchain. The CPG upon receiving the crop, records the received date on the blockchain. When the CPG finishes processing the food and packages it into smaller parts for retail distribution, it needs to enter the original farm label data along with the serial number, and add their own data such as serial number of the new package, received date, shipped date, and expiry dates. The retailer upon receiving the shipment records the date on the blockchain, along with price tags which accounts for the marked up SustainX prices. When it publishes the data, the retailer needs to pay fees to SustainX equivalent to the markup recorded on the label. As discussed earlier in Section, the markup on the fee is about 10-15% maximum depending on the type of label and if there are multiple labels associated with the product.

There could be several cases of fraud activity. For example, a farmer may ship more crop than the coverage enabled by a sensor. If the discrepancy is large, then it is easy to figure out the fraud by calculating the expected yield and the number of sensors assigned to the farm. The expected yield is based on the total size of the farm and their past shipments as recorded by their customers. Such baseline data can be entered when the farm registers to be a part of the SustainX network. Also, the monitoring data should reveal changes over time that reflect an increase in yield.

Another case of fraud activity could be the CPG shipping more SUSX goods than the amount of original crop. Like the farmer, the CPG needs to register with SustainX and provide initial baseline data of the amount of raw crop needed to produce their shipments. Then it's simple to verify the SUSX labeled shipments with the amount of SUSX crop received by the CPG. Additionally, the total amount of SUSX crop received can be verified against the amount of crop shipped by the farmer.

At the retail, a similar fraud activity could take place, where a Retailer exaggerates the number of SUSX shipments received from CPGs, and has more SUSX products on the shelves than actual shipments. This can be verified, again by the protocol, by looking at the CPG shipments that is recorded by the CPG at the time they sent their shipments to the retailers. The farmer, CPG, and Retailer would suffer a much bigger loss of brand, if they were to undertake a fraudulent activity to manipulate the SUSX labeled item numbers.

Proof of Consumer Purchase—

The consumers need to prove that they have purchased SUSX labeled items for them to get reward tokens. The first step for the consumer is to register an account with SustainX and then link their retailer's loyalty card. Retailers use our software to generate Oracle data on the blockchain for every SUSX labeled items purchased at its point of sale and associate every purchase with their unique loyalty card number. Based on the amount of purchase the consumer account is credited with SUSX tokens. If a consumer were to return the items, then their account would be deducted the same number of tokens. The tokens rewarded would need to be locked for a period to prevent any fraudulent scheme of buying and returning items in a quick turnaround to acquire tokens and then spend it. Since a multiple purchase of an item is possible, the retailer could scan one item and add the quantity, and this will be recorded on the blockchain. And so, the serial number on the item does not have to be unique per item, but unique per product category. There is a remote instance of fraud that can take place if the retailer's loyalty card servers are hacked and the attacker pretends to purchase many goods at the store. A way to prevent this is to link the payment processor and have them submit a Oracle data feed with purchases at the store with loyalty card information whenever there is a large purchase of SUSX items, so that the purchase can be validated and the reward token released.

Proof of Consumer Donation—

To encourage donation, the network rewards consumer for donating their excess purchases to food banks. All the items that the consumer brings in are scanned and are verified for expired status. Then based on the number of items returned, the consumer is rewarded some tokens. Any expired items would be rejected and not entered on the blockchain. Initially, the reward would be large to encourage donations and then eventually will be reduced. In the unlikely event where a consumer may donate all their purchases to get more tokens rewards, the token rewards would be such that the dollar value of purchases and donations are never more than the 20% of the item cost.

Proof of Fair Trade—

To incorporate a program for Fair Trade workers, the employers need to open an account with SustainX through a valid KYC/AML (Know Your Customer and Anti-Money Laundering) process, and have all employees that are on the fair-trade program enroll as well. Then they will need to set up payroll process where payments to their employees are recorded on the blockchain. To have a baseline data, the employer needs to present prior year's amount of crop harvested and the number of workers involved in the process, and this needs to be verified by their customer. This data is used to verify the amount of farm shipment that are labeled with SUSX-FT from the farm location. Now it is possible to have efficient workers one year, and inefficient ones the next and there will be some variations, but if the reported shipments are dramatically different from the baseline data, then their accounts would be flagged for 3rd party validation, that may require to reset the baseline data or allow to have a larger variation. It is possible that the employer generated fake accounts for their workers and channel the funds to himself. In this case, the KYC/AML verification process would have failed. The only way to catch such activity is to verify that the fake accounts do not send the funds back to a single account, or redeem them in local currency in a deterministic fashion, or have unusual spending patterns. Of course, the fair-trade worker's customer would need to check the process themselves, otherwise they will suffer a much bigger loss for their brand.

Proof of Free Roam—

Livestock farmers can have a group of their animals (chicken, cattle, pigs, sheep) wear accelerometer sensors that monitor level of activity outside. As they step outside for outdoor activity, the image sensors mounted on the Gateway, detailed in Section, will calculate the number of animals active and record such activity on the blockchain. As with crop farmers, a baseline data is established with the total egg, dairy, poultry, beef, lamb, pork shipments from a farmer and the number of animals in the ranch. Based on such data, the SUSX-FR labels are verified such that the farmers do not overestimate their shipments. It is possible that the farmer could present a false image to the Gateway and have an accelerometer connected to a robot, but this can be verified periodically through satellite images if such activity has taken place and can be recorded on the blockchain. Obviously, the farmer reputation and brand will be at stake if they engage in such fraudulent activity.

Proof of Imperfect Food—

The farmers, CPGs, and retailers have a process where they sort out imperfect food or packaging before they present them to the consumer. With the SUSX-IF label retailers can reduce the price by 30-50% and use the SUSX label to market it in a designated section at the retail store. For every purchase, the labeled item is verified to be at least 25% lower priced than a regular item, even with the addition of SUSX markup. As with the Proof of Shipment and Proof of Consumer Purchase, all the verifications against potential fraudulent behavior apply.

Proof of Optimization—

Figure 5:
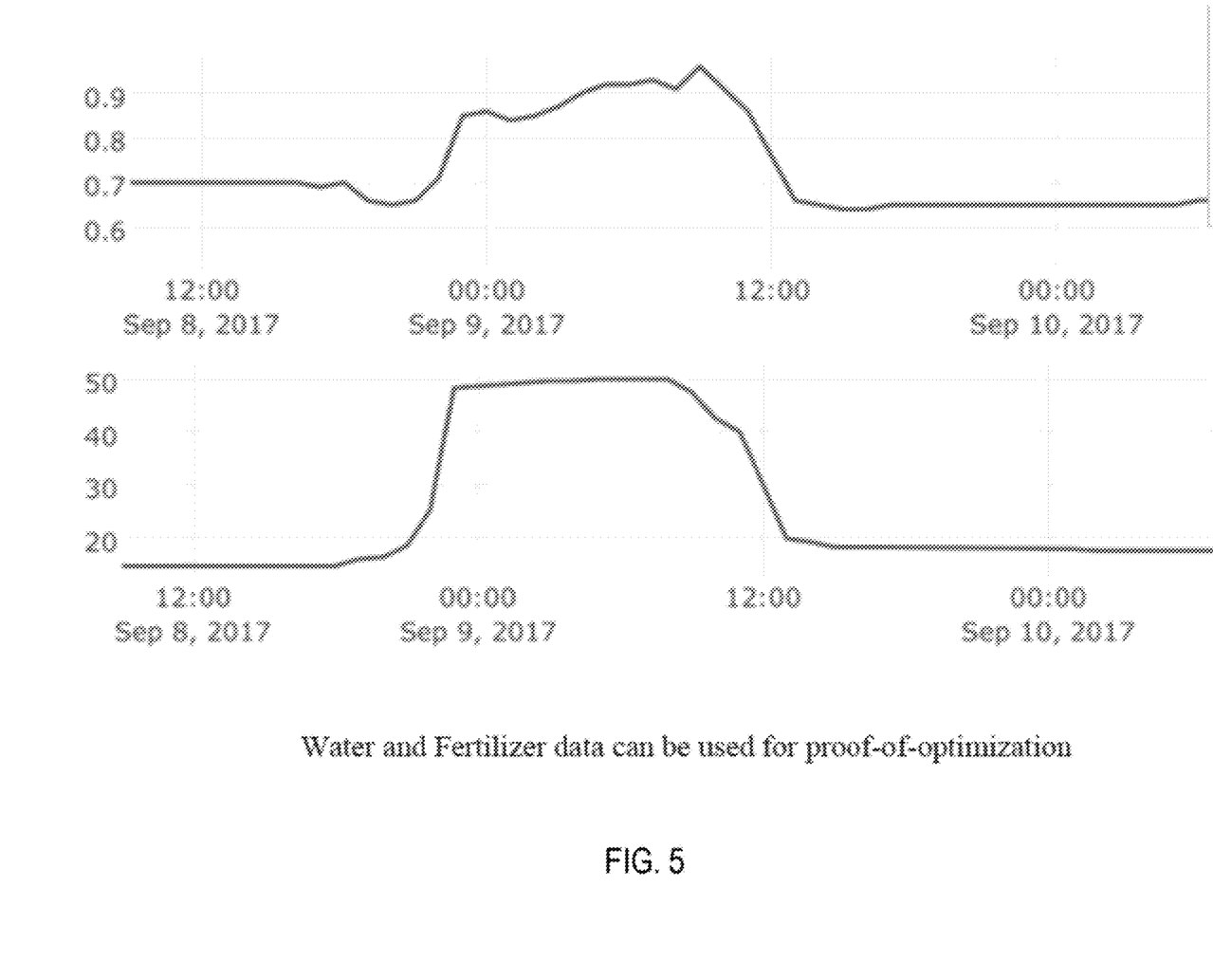
FIG. 5 shows how water and fertilizer data can be used for proof-of-optimization.

While proof of monitoring is a starting point for the farmer, they would like to increase their yield and reduce their input costs. A typical implementation of such activity would be to run a few experiments where they decrease the duration of irrigation and the amount of fertilizer used during the process by 10-30%, and determine if they have a drop in their yield. Or they may choose to increase the frequency of irrigation and reduce the duration and amount of water and fertilizer used in the process. They may also try reducing the flow rate of irrigation by decreasing the pump pressure and try to optimize the absorption by the plant. In any event, these processes can be tried out and the data from the sensor would reflect such activity for the current harvest season can be compared to the previous one, and if there are any optimizations conducted in the growing pattern, then they would be validated as such. As shown in FIG. 5, the duration of irrigation is a very deterministic event for the sensor at a 1 ft level depth, and the amount of salinity measures the composite amount of fertilizer and residual salinity of the previous fertilizer application and that of the irrigated water supply. In some areas, the salinity of the irrigated water supply is high, and the farmer typically engages in a leaching process to reduce the level at the end of the harvest season. A sensor data comparison smart contract can compare the irrigation duration events, frequency, and the amount of salinity from a baseline season and determine if the farmer has optimized resources. The benefit for the farmer is that they can reduce cost and engage in differentiating their brand with SUSX-O, which they can potentially sell at a higher price. As with the Proof of Monitoring, the farmer can label only as many goods as the number of sensors engaged in such optimization activity.

Figure 6:
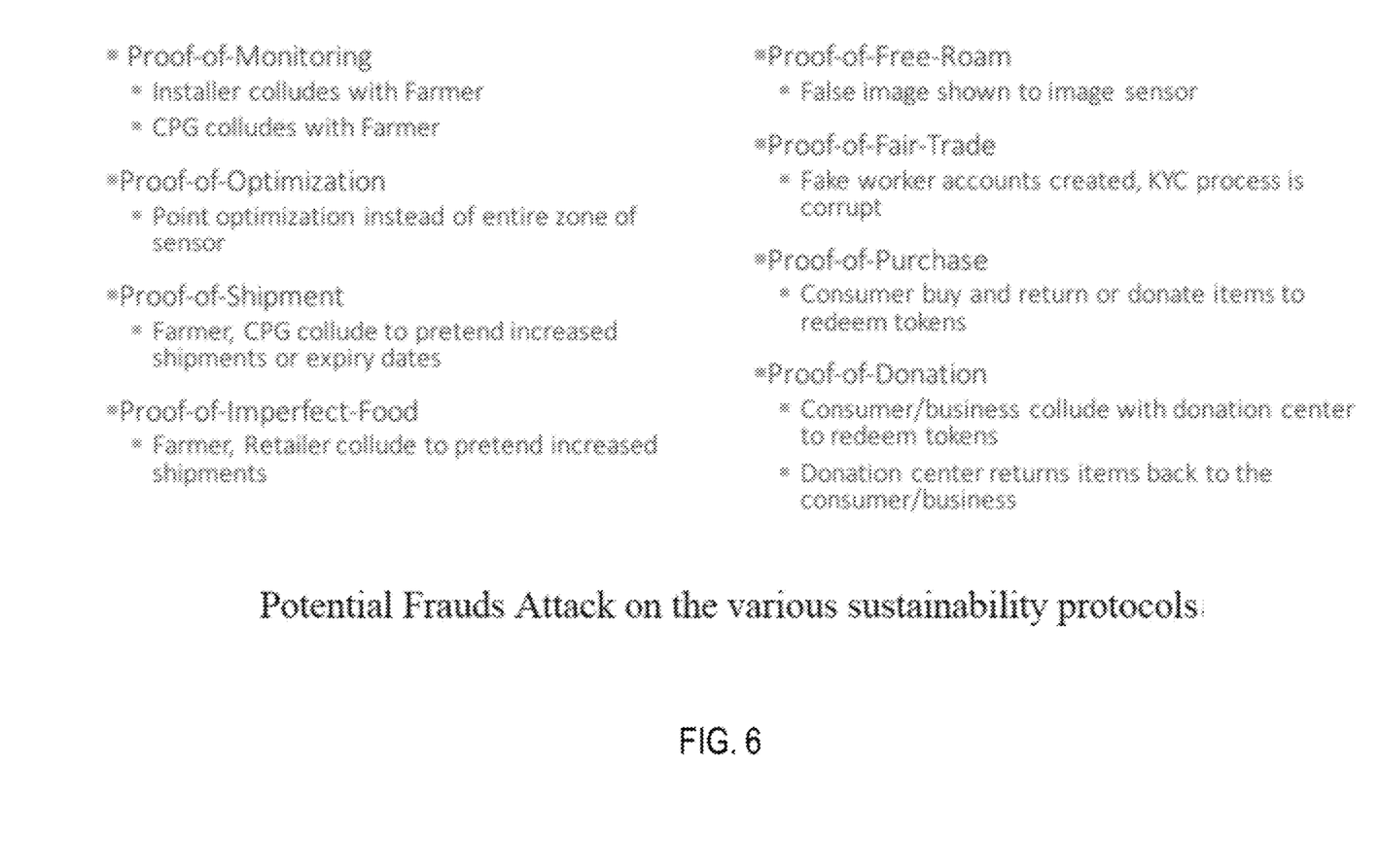
FIG. 6 shows potential fraud attacks on the various sustainability protocols.

A potential fraudulent activity would be to perform a point optimization where they reduce the water and fertilizer level only at the area where the sensor is placed and not the entire plot of land the sensor represents. As mentioned in FIG. 6, a robot deployed as part of the installation would provide verification data as it randomly monitors irrigation event and sends images to record veracity of the process In broad embodiment, the invention is systems and methods of sustainability protocol using distributed blockchain application with IoT sensors includes flexibility in tracking product information from origin to consumption with sustainability parameters and/or rewards.

Different embodiments described herein include components or structures to perform the described functionality. A "component" or a "module" as used in this disclosure, includes a dedicated or shared processor and, typically, firmware or software modules executed by the processor. Depending upon implementation-specific or other considerations, a component or a module can be centralized or its functionality distributed. A component can include special purpose hardware, firmware, or software embodied in a computer-readable medium for execution by the processor.

Figure 7:
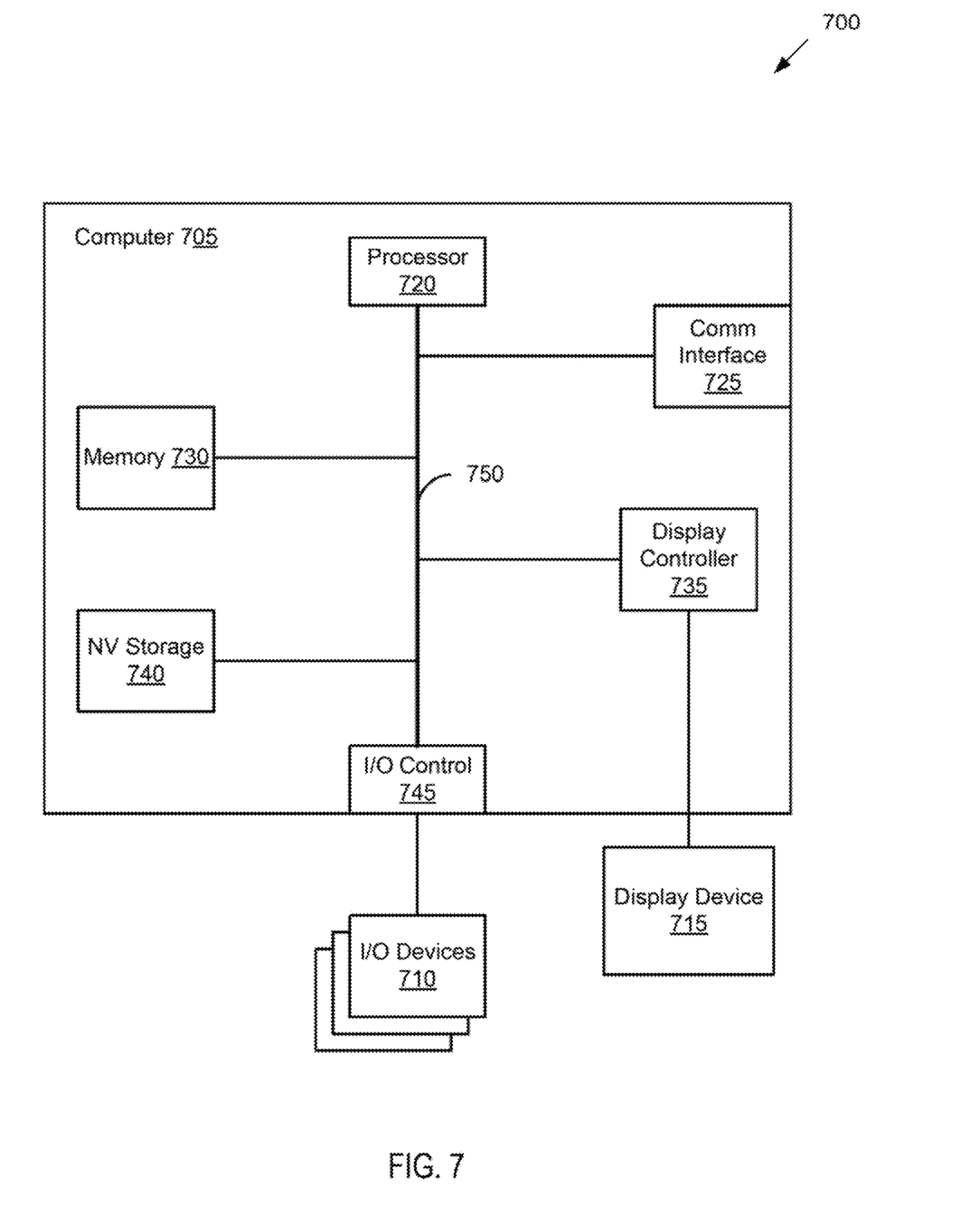
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, a consumer system 810, an origin manufacturer system 850, an intermediary system 820-1 to 820-$n$ and/or product system 830-1 to 830-$n$ of FIG. 8 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Several components described here, including clients, servers, and engines, can be compatible with or implemented using a cloud-based computing system. As used here, a cloud-based computing system is a system that provides computing resources, software, and/or information to client systems by maintaining centralized services and resources that the client systems can access over a communications interface, such as a network. The cloud-based computing system can involve a subscription for services or use a utility pricing model. Users can access the protocols of the cloud-based computing system through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

Figure 8:
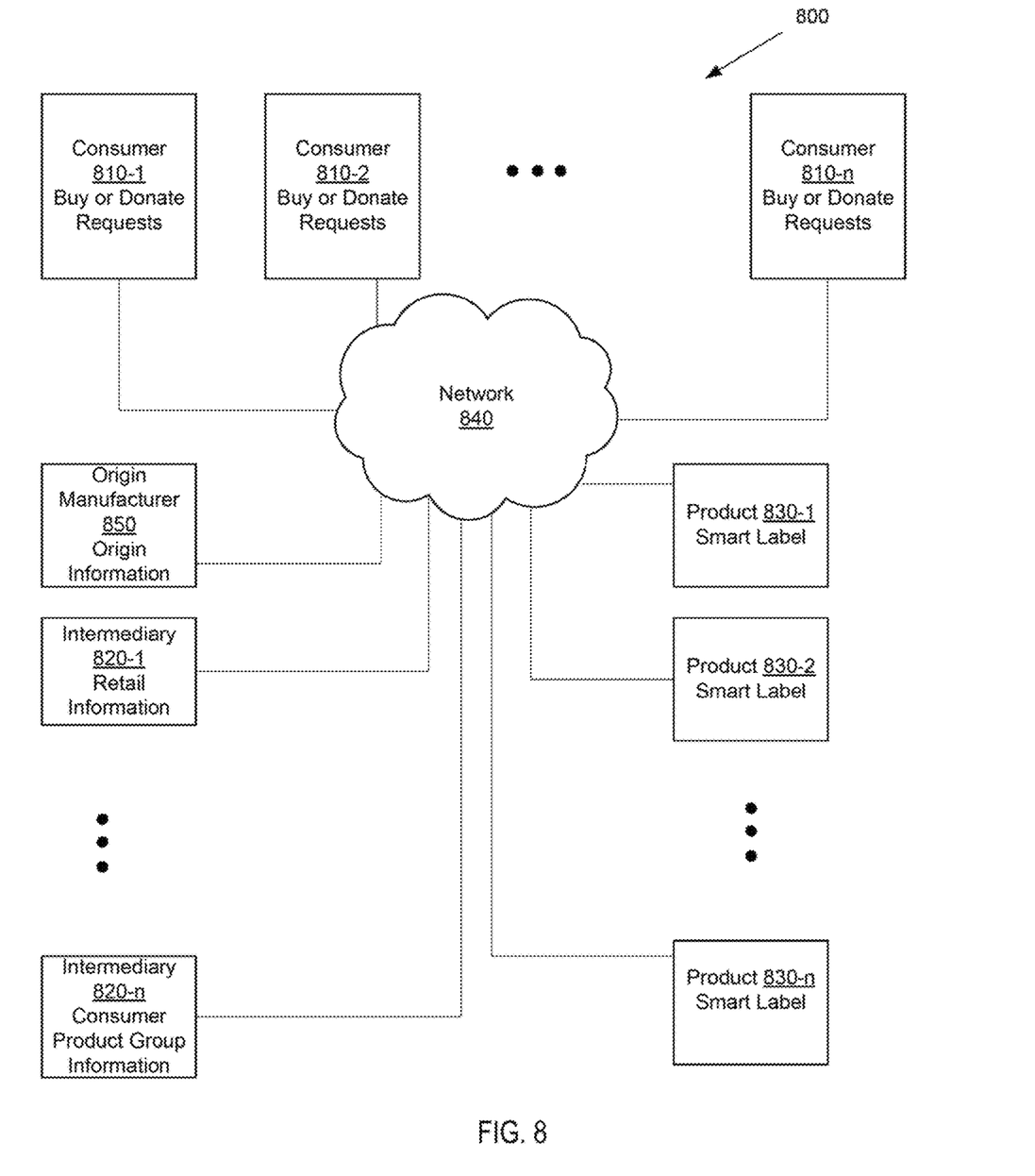
FIG. 8 shows a diagram illustrating an example of a system and method of a smart digital label for a consumer product on a blockchain platform using IoT sensor.

FIG. 8 shows the process for establishing a connection using network 840 between consumers 810, origin manufacturer 850, intermediary 820 and product smart label 830. In the example of FIG. 8, the environment includes a first consumer system 810-1 through nth consumer system 810-n, network 840, origin manufacture 850, intermediary system 820-1 through nth 820-n and product smart label system 830-1 through nth 830-n for existing infrastructure. In an implementation, the consumer system 810-1 includes a buy or donate requests tracking system. The application on the consumer system 810-1 that implements the buy or donation requests components includes applications to interact directly with the blockchain platform to initiate, store, update, get and track information irrespective of the consumer product origin or intermediary systems.

In an implementation, the product smart label system 830 for existing infrastructure indexed on products includes one or more blockchains on a distributed application platform to maintain information regarding different products provided by different origin and intermediary systems. In an implementation the data may be indexed for easy search on location, current parameters, origin, intermediary, buy or donate requests.

In an implementation, consumer system 810-1 can interact and share data with other consumer system(s) 810-2, . . . 810-n. For example, consumer system 810-1 may be coordinating product data with family members and friends who may each have their own consumer system 810-n. The consumer system 810-1 based on user settings can also automatically or manually interact with social media applications to give status updates to family and friends on his or her status, likes and dislikes. In an implementation, the social media applications would include facebook, google plus, linkedin and twitter. In one embodiment, the 810-1 is a mobile application that resides on a user's mobile device. For example, the user may use the mobile application to receive information regarding real-time product information inside a facility and make different choices on upcoming sales or events based on real-time activity tracking. In one implementation, the consumer system 810-1 may track for real-time alerts and notifications on changed parameters and information for a category of products.

In one implementation, the consumer product interface 810-1 is part of a user's mobile phone application. For example, to the extent the user's mobile phone has near field communication (NFC) technologies, the user's subscription would seamlessly use NFC to provide interactions with other NFC enabled devices. For example, a user may use his NFC to make purchases. Similarly, if the user's phone has radio frequency identification (RFID) or Bluetooth technologies, the subscription can use that to tag the user's presence and preferences.

Network 840 can be different wireless and wired networks available to connect different computer devices including client and server systems. In an implementation, network 840 is publically accessible on the internet. In an implementation, network 840 is inside a secure corporate wide area network. In an implementation, network 840 allows connectivity of different systems and devices using a computer-readable medium. In an implementation, the route optimization and schedule coordination system allows user on the client system or the activity provider to set privacy settings that allow data to be shared among select family and friends, but the same data is not accessible publically by others.

The messaging and notification between different components can be implemented using application programming interface (API) calls, extensible markup language ("XML") interfaces between different interfaces, Java/C++ object oriented programming or simple web-based tools. Different components may also implement authentication and encryption to keep the data and the requests secure.

In an implementation, the origin manufacturer 850 provide origin information to the product smart label system 830-1. The origin information includes farm lot, sensor, harvest information, imperfect food or free roam information. The goal of providing additional information on origin helps the end-user consumer system to track sustainability parameters irrespective of where the product eventually ends up and is sold.

In an implementation, the intermediary system 820-1 provides retail or shipment information including shipped to, retail, farmer price paid and end-user price, consumer product group price or retail price expected. In an implementation, intermediary system 820-1 can interact and share data with other consumer system(s) 820-2, . . . 810-n and origin manufacturer 850. For example, intermediary system 820-1 may be compare how other intermediaries up or down the line of shipment and locations will change the overall price on the product 830-1. In an implementation, a statistical tracking for different products helps improve and makes the intermediary system more efficient in terms of offering better terms and increasing profits by aligning itself to market demand.

In an implementation, the product smart label system 830-1 provides sustainability price based on different parameters. In one implementation, the product smart label 830-1 corrects the sustainability price based on regular, sustainability parameters and organic parameters. In an implementation, the product smart label 830-1 tracks consumer 810-1 donations. In an implementation, the product smart label 830-1 tracks the overall impact and effectiveness of reducing product waster and improving pricing. In an implementation, intermediary system 830-1 can interact and share data with other intermediary system(s) 830-2, . . . 830-n. In an implementation, a statistical tracking for different products helps improve and makes the intermediary system more efficient in terms of offering better terms and increasing profits by aligning itself to market demand.

Figure 9:
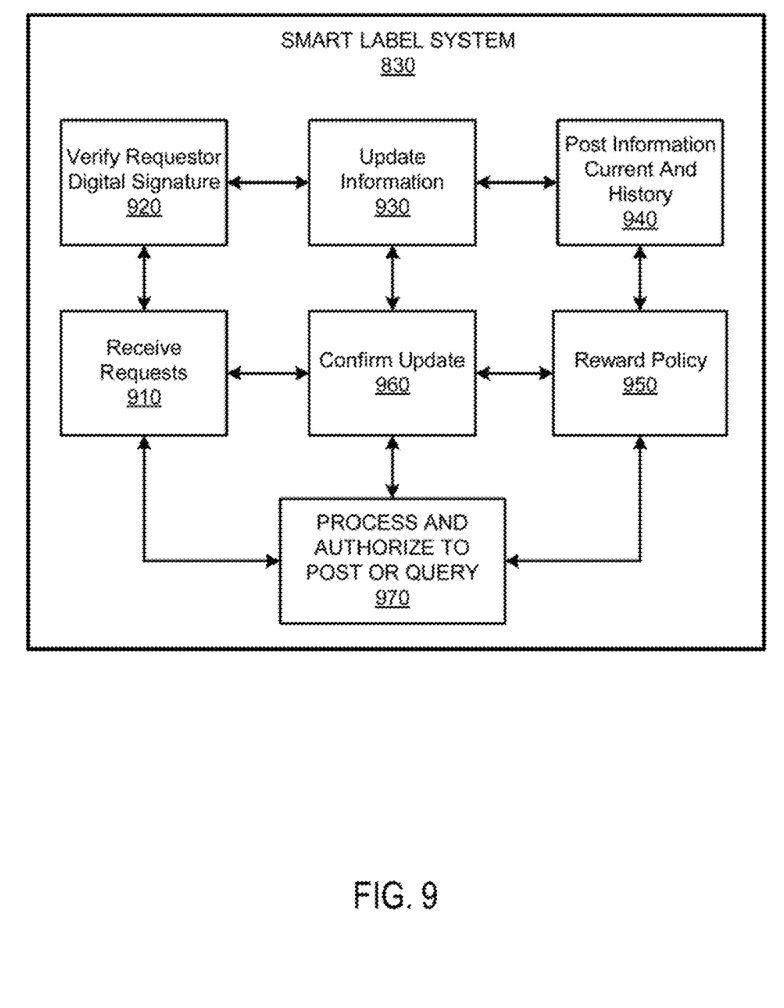
FIG. 9 shows an exploded view of a smart label system, according to one embodiment.

FIG. 9 discloses an embodiment of a product smart label system 830 with different modules. The product smart label system 830 processes and authorizes post or query on the block chain platform 970. The module 910 receives requests from consumer systems, manufacturers or third party interested in the information. The requests can be buy, donate or get information requests. The module 920 verifies the requestor digital signature to ensure that the entity making the request is authorized to do so. Depending on the request, the product smart label system 830 can update information 930. If the request is a get request, the post information current and history 940 is updated and sent. The reward policy 950 will adjust the sustainability price for the product as well as track rewards to consumers for making donations and origin or intermediary manufacturer for adhering to sustainability parameters shown by IoT sensor data. The request is confirmed at 960.

Figure 10:
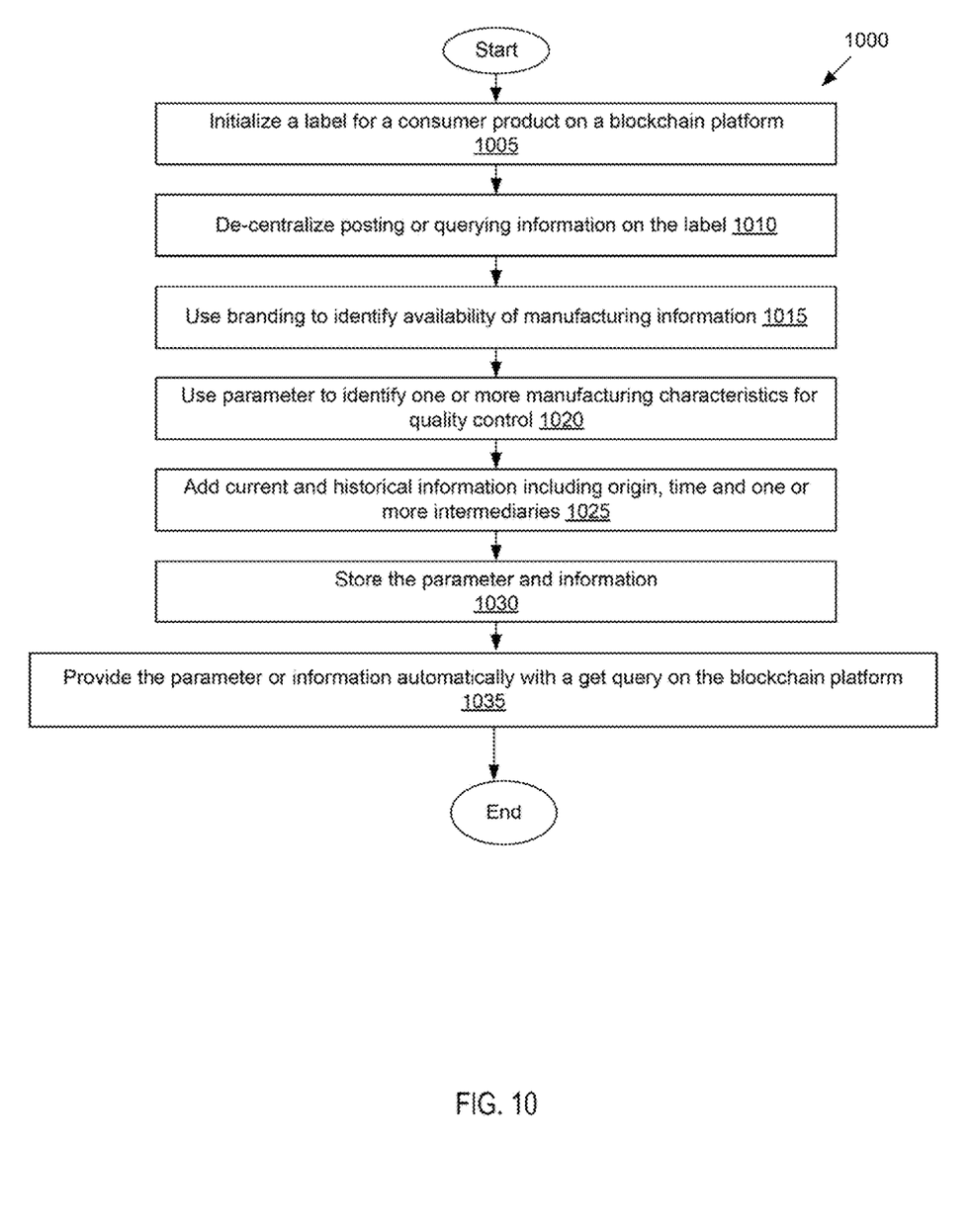
FIG. 10 shows a flowchart illustrating an example of a method of smart digital labeling on a consumer product on a blockchain platform using IoT sensor.

FIG. 10 depicts a flowchart 1000 illustrating an example of a method of sustainability protocol using distributed blockchain application with IoT sensors in a computer network environment. The flowchart 1000 is discussed in conjunction with the environment shown in the diagram 800 in FIG. 8.

At block 1005, an origin manufacturer 850 initializes the origin information for a consumer product on a blockchain platform. At block 1010, the blockchain platform provides de-centralized posting or querying information on different chains for different product labels. At block 1015, branding is used to identify availability of manufacturing information. At block 1020, parameter is used to identify one or more manufacturing characteristics for quality control. At 1025, current and historical information including origin, time and one or more intermediaries is added. At 1030, product smart label system stores the parameter and information on the blockchain platform. At 1035, the stored parameter and information is automatically provided with a get query on the blockchain platform.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method of smart digital labeling on a consumer product on a distributed blockchain platform and associated smart vault, comprising:
   de-centralizing posting or querying information on the consumer product;
   branding to identify availability of manufacturing information;
   parametrically identify one or more manufacturing characteristics for quality control;
   adding current and historical information including origin, time and one or more intermediaries;
   storing the parameter and the information;
   receiving value for the smart vault from manufacturer of the consumer product or one or more intermediaries;
   providing automatically with a get query on the blockchain platform the parameter or the information;
   applying the received value to support the distributed blockchain platform.

2. The method of claim 1, wherein the information includes identification of farm lot, farmer price, harvest date, shipment date, consumer product group identification, consumer product group price, retailer identification, or retailer price.

3. The method of claim 1, wherein the branding further includes one or more of the sustainability parameters: water usage, fertilizer usage, fair trade, imperfect food or free roam labels.

4. The method of claim 1, further comprising:
automatically preventing fraud and collusion between the origin manufacturer and any of the intermediaries.

5. The method of claim 1, further comprising:
sensing with an Internet of thing sensor to automatically add brand, parameter or the information.

6. The method of claim 1, further comprising:
automatically adjusting applicable consumer price based on brand, parameter or the information.

7. The method of claim 1, further comprising:
authorizing a smart contract to reward value from the smart vault to an origin manufacturer or one or more of the intermediaries based on brand, parameter or the information.

8. The method of claim 1, further comprising:
automatically tracking the smart vault for any subsequent sale or donation and crediting a seller or a donor.

9. The method of claim 1, further comprising:
accumulating information on the blockchain platform independent of and outside the control of an origin manufacturer or one or more intermediaries.

10. A method of smart digital labeling on a consumer product on a distributed blockchain platform and associated smart vault, comprising:
de-centralizing posting or querying information on the consumer product;
sustainability parametrically identify one or more manufacturing characteristics for quality control;
adding donation information for a donor;
receiving donation value for the smart vault from the donor;
tracking automatically with a get query on the blockchain platform the sustainability parameter with the donation information;
applying the received value to support the distributed blockchain platform.

11. A method of smart vault on a blockchain platform for consumer product, comprising:
attributing a smart storage for a given entity;
receiving a portion of any applicable price in a transaction for the given entity for smart storage;
applying the received portion for sustainability infrastructure;
restricting withdrawal from the smart storage in absence of authorization;
allowing withdrawal when two or more authorization steps independent of each other are established.

12. A system of smart digital labeling on a consumer product on a distributed blockchain platform and associated smart vault, comprising:
a module to de-centralize posting or querying information on the consumer product;
a module to brand a consumer product to identify availability of manufacturing information;
a module to use a parameter to identify one or more manufacturing characteristics for quality control;
a module to add current and historical information including origin, time and one or more intermediaries;
a module to store the parameter and the information;
a module to receive value for the smart vault from manufacturer of the consumer product or one or more intermediaries;
a module to provide automatically with a get query on the blockchain platform the parameter or the information;
a module to apply the received value to support the distributed blockchain platform.

13. The system of claim 12, wherein the information includes identification of farm lot, farmer price, harvest date, shipment date, consumer product group identification, consumer product group price, retailer identification, or retailer price.

14. The system of claim 12, wherein the branding further includes water usage, fertilizer usage, fair trade, imperfect food or free roam labels.

15. The system of claim 12, further comprising:
a module to automatically prevent fraud and collusion between an origin manufacturer and any of the intermediaries.

16. The system of claim 12, further comprising:
a module to use an Internet of thing sensor to automatically add brand, parameter or the information.

17. The system of claim 12, further comprising:
a module to automatically adjust applicable consumer price based on brand, parameter or the information.

18. The system of claim 12, further comprising:
a module to authorize a smart contract to reward value from the smart vault to an origin manufacturer or one or more of the intermediaries based on brand, parameter or the information.

19. The system of claim 12, further comprising:
a module to automatically track the smart vault for any subsequent sale or donation and crediting a seller or a donor.

20. The system of claim 12, further comprising:
a module to accumulate information on the blockchain platform independent of and outside the control of an origin manufacturer or one or more intermediaries.

21. A system of smart digital labeling on a consumer product on a distributed blockchain platform and associated smart vault, comprising:
a module to de-centralize posting or querying information on the consumer product;
a module to use a sustainability parameter to identify one or more manufacturing characteristics for quality control;
a module to add donation information for a donor;
a module to receive donation value for the smart vault from the donor;
a module to track automatically with a get query on the blockchain platform the sustainability parameter with the donation information;
a module to apply the received value to support the distributed blockchain platform.

22. A system of smart vault on a blockchain platform for a consumer product, comprising:
a module to attribute a smart storage for a given entity;
a module to receive a portion of any applicable price in a transaction for the given entity for smart storage;
a module to apply the received portion for sustainability infrastructure;
a module to restrict withdrawal from the smart storage in absence of authorization;
a module to allow withdrawal when two or more authorization steps independent of each other are established.

* * * * *